United States Patent Office 3,826,811
Patented July 30, 1974

3,826,811
SULPHUR REMOVAL FROM NATURAL GAS
Leo Ernest Hakka, Montreal, Quebec, Canada, assignor to Union Carbide Canada Limited, Toronto, Ontario, Canada
No Drawing. Filed July 12, 1971, Ser. No. 162,015
Int. Cl. B01d 53/34
U.S. Cl. 423—229                                    4 Claims

ABSTRACT OF THE DISCLOSURE

A process for dissolving elemental sulphur entrained in a hydrocarbon gas is described which consists of contacting the gas with an aqeous solution containing from 5 to 50 percent by weight of monoethanolamine and then separating the sulphur-laden solution from the gas.

This invention relates to a process for dissolving sulphur from hydrocarbon gas. More particularly it relates to a process for inhibiting the deposition of elemental sulphur from sour natural gas in the gas well, by treating the well with a solvent for the elemental sulphur and subsequently separating the solvent from the gas.

Natural gas in the well frequently contains hydrogen sulphide and carbon dioxide as well as other sulphur compounds. It is known that natural gas containing these compounds is capable of dissolving a substantial amount of elemental sulphur. When the gas is brought up through the well it is cooled and decompressed, causing much of the elemental sulphur to precipitate. The sulphur deposits in the system block the well formation, tubing, measuring devices and other equipment both at the well head and below ground. It was found desirable therefore that means be found for preventing this deposition or for removing sulphur already deposited in the well system.

Various methods in the prior art have been used for this purpose. The most commonly used solvent for this purpose is carbon disulphide. The carbon disulphide serves to dissolve the sulphur which is then separated from the gas as a liquid phase when it reaches the well head. Various drawbacks are found in the use of this solvent however. Not only is carbon disulphide highly toxic but it is inflammable and thus highly dangerous to use in a natural gas system. Carbon disulphide has the added disadvantage of being a contributor of the pollution of the atmosphere due to the fact that after the well has been washed with carbon disulphide it has to be flared to ensure that no carbon disulphide remains which would contaminate the natural gas flowing to the processing plant. This flaring would add a considerable amount of sulphur compounds to the atmosphere, as well as cause the loss of considerable quantities of hydrocarbons.

Aqueous alkaline solutions have also been used for dissolving the elemental sulphur. Since the sour natural gas usually contains carbon dioxide however, the carbon dioxide reacts with the alkali solution to form solid carbonates, which may themselves cause clogging of the equipment.

Another solvent previously used for dissolving elemental sulphur is aqueous ethylamine. Ethylamine has a disadvantage not encountered with carbon disulphide however in that the aqueous solutions having a concentration sufficient to provide maximum sulphur dissolving efficiency would be from about 15–35% by weight of ethylamine in water. These solutions would have a minimum freezing point of about −14° C. During winter conditions in areas such as Alberta where natural gas is found, the temperatures drop to −35° to −40° or even lower. The use of an ethylamine solution would therefore require the heating of the pumping equipment or the inclusion of an antifreeze to prevent freeze up. The antifreeze which would be a compound such as methanol or ethylene glycol would contribute very little to the sulphur solvency but would add to the cost of the process. Another disadvantage is that an ethylamine solution from 15–35% by weight in water would tend to precipitate the dissolved sulphur as polysulphide when the solution is cooled below 30 to 35° C. It can be appreciated that in the severe winter conditions found at the well head it would be difficult to maintain the solvent above these temperatures. Failure to maintain the solvent at such a temperature would result in premature precipitation of the sulphur.

The applicant has found that the above disadvantages of toxicity, flammability, atmospheric pollution and high freezing point described above can be substantially overcome by using an aqueous solution of monoethanolamine in the manner to be described below.

It is therefore an object of this invention to provide an improved process for dissolving the deposits of elemental sulphur in sour hydrocarbon gas wells.

These and other objects are obtained by means of a process which comprises contacting a sulphur laden hydrocarbon gas with an aqueous solution containing from 5 percent by weight to 50 percent by weight of monoethanolamine and then separating the sulphur-laden aqueous solution from the gas.

A comparison of some of the characteristics of monoethanolamine against ethylamine solutions can be seen from the examples given below.

EXAMPLE I

The solubility of elemental sulphur in various ethylamine solutions was measured as follows. A cyclindrical glass flask was equipped with a sintered glass gas sparger and an exit for waste gas so that a solution placed in the flask could be brought into intimate contact with a gas. A stirring bar magnetically coupled to an external stirring motor was provided to agitate the contents of the cylindrical flask. The flask was then immersed in a water bath whose temperature could be adjusted by adding hot or cold water while agitation of the bath was supplied by a second magnetized stirring bar placed between the stirring motor and the stirring bar in the cylindrical flask.

The solubility of sulphur in a given solution was determined by placing into the cylindrical flask a known quantity of solvent, usually 100 grams, and a weighed amount of sulphur. The amount of sulphur added as flowers of sulphur, was in excess of that which the solvent could dissolve. The mixture of solvent plus sulphur was stirred and saturated with pure hydrogen sulphide by means of the sintered glass sparger connected to a supply cylinder of gas. Excess hydrogen sulphide not absorbed by the liquid was piped into a caustic solution to render it harmless. The water bath was maintained at the desired temperature and the system was allowed to equilibrate in temperature and sulphur content. The flow of hydrogen sulphide was then discontinued and the content of the cylindrical flask was then filtered to separate the solid material. The residue on the filter paper was rinsed with water to remove any solid polysulphide salt that may have precipitated. The residual sulphur was then dried and weighed. The solubility of sulphur was then the difference between the weight of sulphur placed in the solvent initially minus that which was isolated on the filter paper at the end of the experiment. The solubility measured in this manner was reproducible within less than 5% from experiment to experiment.

| Weight percent ethylamine in aqueous solution | Temperature, °C. | Sulphur solubility, g./100 g. solvent |
|---|---|---|
| 20 | 20 | 21 |
| 35 | 20 | 49 |
| 35 | 40 | 50 |
| 55 | 60 | About 65–70 |

In the Example given below the solubility of elemental sulphur in various aqueous solutions of monoethanolamine are given. While ethylamine has a higher sulphur solubility per unit weight of amine at the temperatures given, it must be borne in mind that the ethylamine solutions have the disadvantage of high freezing point and are more prone to precipitate the elemental sulphur on cooling. It should also be pointed out that the ethylamine solution is more flammable in that a 70% ethylamine solution has a flash point of less than 0° F. whereas a 70% aqueous solution of monoethanolamine has a flash point of 200° F. The aqueous ethanolamine solution also has the characteristic of having a lower vapour pressure than the ethylamine and would therefore be less prone to being carried through the sweetening unit into the Claus unit in the processing of the natural gas. While quantities of monoethanolamine as low as 5% by weight can be used, under conditions wherein the lower freezing point is not an important factor, solutions of 20% by weight to 50% by weight of monoethanolamine provides desirably low freezing points for operating under winter conditions.

EXAMPLE II

The solubility of sulphur in various concentrations of aqueous monoethanolamine saturated with $H_2S$ was measured as in Example I. The results are given below:

| Weight percent monoethanolamine in an aqueous solution | Temperature, °C. | Solubility, g./100 g. solvent |
|---|---|---|
| 5 | 20 | 1.0 |
| 7 | 20 | 1.5 |
| 12 | 20 | 6.3 |
| 20 | 20 | 11.5 |
| 27 | 20 | 18.3 |
| 35 | 20 | 24.0 |
| 38.5 | 20 | 25.0 |
| 41 | 20 | 22.2 |
| 42 | 20 | 21.9 |
| 44 | 20 | 21.7 |
| 35 | 40 | 30.5 |
| 40 | 40 | 36.4 |
| 45 | 40 | 42.2 |
| 50 | 40 | 43.9 |
| 45 | 60 | 44.6 |

EXAMPLE III

The temperatures at which solid polysulphide salt starts to precipitate from various solutions containing various amounts of dissolved sulphur were measured using the same apparatus and method as in Example I. The quantity of sulphur added was so chosen that all would dissolve, enabling the observation of precipitated polysulphide salt without confusion with elemental sulphur. The filtration and weighing procedure was not performed. The results are given below:

| Aqueous solution | Sulphur dissolved, g./100 g. solvent | Precipitation temperature, °C. |
|---|---|---|
| 35% ethylamine | 45.4 | 30 |
| Do | 36.7 | 25 |
| 55% ethylamine | 69.2 | 45 |
| 45% monoethanolamine | 30.3 | 30 |
| Do | 40.3 | 36 |

For convenient use, the sulphur solvent should have a low freezing point, less than —30° C. being most desirable. Monoethanolamine at a concentration of 45% by weight in water has a freezing point of —35° C., whereas 55% ethylamine is required to achieve a —31° C. freezing point. The data of Example III show that when these solutions are saturated with sulphur, the 55% ethylamine solution precipitates polysulfide salt at a temperature of about 45° C. whereas the 45% monoethanolamine solution of roughly equivalent freezing point precipitates polysulfide salt at about 36° C. Thus, it is seen that the sulphur-laden monoethanolamine solutions have a much lesser tendency to precipitate the solid polysulphide salt, which would tend to plug the equipment.

It is readily apparent to those familiar with the art that certain additives may be included with the monoethanolamine and water to increase the usefulness of the solution. For example, various corrosion inhibitors such as film forming amines may be included in the formulation to simultaneously dissolve sulphur and protect the well against corrosion.

An aqueous monoethanolamine solution as described herein may be added to sour natural gas as it rises from the gas well. An example of a sour gas found in the gas well from a gas field in Alberta, Canada may contain from 3% to 50% by volume or more of hydrogen sulphide, up to 20% by volume of carbon dioxide as well as water and small amount of carbonyl sulphide, carbon disulphide and mercaptans. Since the tempertaure in the bed of the well may be 200° C. or more depending on its depth, the gas may be saturated with elemental sulphur and may, for example, contain about 2 grams of sulphur per cubic meter of gas. The gas pressure at the bottom of the bed may be approximately 390 atmospheres depending on its depth, and to this rising gas stream is added an aqueous solution of ethanolamine containing from 20–45 weight percent of ethanolamine per weight of water. This solution is added to the rising gas stream at a rate of from 500–1000 litres per hour. The gas produced at the well head would be at a rate of approximately 8000–12,000 cu. meters per hour.

The gas produced at the well head is then subjected to a mechanical separation process where the ethanolamine solution is removed and then distilled whereby the sulphur is precipitated as a polysulphide from the distillation residue.

I claim:
1. A procss for inhibiting sulphur deposits in hydrocarbon gas wells containing hydrocarbon gas laden with sulphur in the form of hydrogen sulphide and dissolved elemental sulphur, which process comprises: contacting the hydrocarbon gas with an aqueous solution containing from 5 percent by weight to 50% by weight of monoethanolamine dissolving the sulphur in said aqueous solution and separating the aqueous solution from the hydrocarbon gas.

2. A process as claimed in claim 1 wherein the sulphur is contacted with the aqueous solution at a temperature above 60° C.

3. A process as claimed in claim 2 wherein said aqueous solution contains from 20 percent by weight to 45 percent by weight of said monoethanolamine.

4. A process as claimed in claim 2 wherein said aqueous solution contains from 40 percent by weight to 45 percent by weight of said monoethanolamine.

References Cited

UNITED STATES PATENTS

| 3,545,916 | 12/1970 | Deicher et al. | 23—2 R |
| 2,688,368 | 9/1954 | Rodgers et al. | 23—2 R |
| 3,331,657 | 7/1967 | Peter et al. | 23—3 R |

EARL C. THOMAS, Primary Examiner

U.S. Cl. X.R.

423—243, 567; 166—312